(12) United States Patent
Mujtaba et al.

(10) Patent No.: US 10,849,071 B2
(45) Date of Patent: *Nov. 24, 2020

(54) WI-FI LOW ENERGY PREAMBLE

(71) Applicant: Apple Inc., Cupertino, CA (US)

(72) Inventors: Syed Aon Mujtaba, Palo Alto, CA (US); Joonsuk Kim, Saratoga, CA (US)

(73) Assignee: Apple Inc., Cupertino, CA (US)

( * ) Notice: Subject to any disclaimer, the term of this patent is extended or adjusted under 35 U.S.C. 154(b) by 25 days.

This patent is subject to a terminal disclaimer.

(21) Appl. No.: 16/244,755

(22) Filed: Jan. 10, 2019

(65) Prior Publication Data

US 2019/0150092 A1 May 16, 2019

Related U.S. Application Data

(63) Continuation of application No. 15/592,355, filed on May 11, 2017, now Pat. No. 10,206,173, which is a continuation of application No. 14/626,947, filed on Feb. 20, 2015, now Pat. No. 9,681,386.

(Continued)

(51) Int. Cl.
*G08C 17/00* (2006.01)
*H04W 52/02* (2009.01)
(Continued)

(52) U.S. Cl.
CPC ... *H04W 52/0238* (2013.01); *H04W 28/0221* (2013.01); *H04W 84/12* (2013.01);
(Continued)

(58) Field of Classification Search
CPC ......... H04W 52/0238; H04W 28/0221; H04W 84/12
(Continued)

(56) References Cited

U.S. PATENT DOCUMENTS

| 8,072,980 | B1 | 12/2011 | Zhang |
| 2006/0034178 | A1 | 2/2006 | Yang et al. |

(Continued)

FOREIGN PATENT DOCUMENTS

| JP | 2007521727 | 8/2007 |
| JP | 2013509106 | 3/2013 |

(Continued)

OTHER PUBLICATIONS

Japanese Office Action, Application No. 2015-038108, dated Mar. 24, 2016, 13 pages.

(Continued)

*Primary Examiner* — Mang Hang Yeung
(74) *Attorney, Agent, or Firm* — Kowert, Hood, Munyon, Rankin & Goetzel, P.C.

(57) ABSTRACT

This disclosure relates to low energy communication techniques. According to some embodiments, a wireless transmission may be received by a wireless device. The wireless transmission may include a physical layer (PHY) preamble and PHY data. The PHY preamble may include destination information indicating a destination and length information indicating a length (or duration) of the wireless transmission. The destination and length information may be included prior to a portion of the PHY preamble configured for channel estimation. The wireless device may determine whether the wireless transmission is destined to the wireless device based on the destination information. If the wireless transmission is not destined to the wireless device, the wireless device may drop a remainder of the wireless transmission.

20 Claims, 7 Drawing Sheets

CP: Cyclic Prefix
TR: Training Sequence

Related U.S. Application Data

(60) Provisional application No. 61/948,754, filed on Mar. 6, 2014.

(51) Int. Cl.
*H04W 28/02* (2009.01)
*H04W 84/12* (2009.01)

(52) U.S. Cl.
CPC ............ *Y02D 70/00* (2018.01); *Y02D 70/122* (2018.01); *Y02D 70/1242* (2018.01); *Y02D 70/1262* (2018.01); *Y02D 70/1264* (2018.01); *Y02D 70/142* (2018.01); *Y02D 70/144* (2018.01); *Y02D 70/146* (2018.01); *Y02D 70/164* (2018.01); *Y02D 70/168* (2018.01); *Y02D 70/26* (2018.01)

(58) Field of Classification Search
USPC ......................................................... 370/311
See application file for complete search history.

(56) References Cited

U.S. PATENT DOCUMENTS

| | | |
|---|---|---|
| 2006/0072614 A1 | 4/2006 | Ogiso et al. |
| 2006/0182188 A1 | 8/2006 | Sato |
| 2009/0092039 A1 | 4/2009 | Niu et al. |
| 2011/0170627 A1* | 7/2011 | Kwon ................. H04L 25/0204 375/295 |
| 2011/0184475 A1 | 7/2011 | Garcia-Bengochea |
| 2011/0194475 A1* | 8/2011 | Kim ...................... H04L 1/0053 370/311 |
| 2012/0294294 A1* | 11/2012 | Zhang .................. H04L 1/0025 370/338 |
| 2013/0044877 A1 | 2/2013 | Liu et al. |
| 2013/0058273 A1 | 3/2013 | Wentink |
| 2014/0201212 A1 | 7/2014 | Qi et al. |
| 2015/0117433 A1 | 4/2015 | Zhang |

FOREIGN PATENT DOCUMENTS

| | | |
|---|---|---|
| WO | 2004114596 | 12/2004 |
| WO | 2011050324 | 4/2011 |
| WO | 2013032584 | 3/2013 |
| WO | 2013165582 | 11/2013 |

OTHER PUBLICATIONS

Chinese Office Action, Application No. 201510097912.X, dated Nov. 6, 2017 (English and Chinese versions); 22 pages.
Office Action, German Application No. DE 10 2015 203 508.5, dated Feb. 22, 2018, 3 pages.

\* cited by examiner

CP: Cyclic Prefix
TR: Training Sequence

WI-FI LOW ENERGY PREAMBLE

PRIORITY CLAIM

The present application is a continuation of U.S. patent application Ser. No. 15/592,355, entitled "Wi-Fi Low Energy Preamble," filed on May 11, 2017, which is a continuation of U.S. patent application Ser. No. 14/626,947, entitled "Wi-Fi Low Energy Preamble," filed on Feb. 20, 2015, now U.S. Pat. No. 9,681,386, which claims benefit of priority to U.S. Provisional Application No. 61/948,754 titled "Wi-Fi Low Energy Preamble Field" and filed on Mar. 6, 2014, and which are all hereby incorporated by reference in their entirety as though fully and completely set forth herein.

The claims in the instant application are different than those of the parent application or other related applications. The Applicant therefore rescinds any disclaimer of claim scope made in the parent application or any predecessor application in relation to the instant application. The Examiner is therefore advised that any such previous disclaimer and the cited references that it was made to avoid, may need to be revisited. Further, any disclaimer made in the instant application should not be read into or against the parent application or other related applications.

FIELD

The present disclosure relates to wireless communication, including to techniques for performing wireless communication with reduced power consumption in systems such as IEEE 802.11 wireless systems.

DESCRIPTION OF THE RELATED ART

Wireless communication systems are rapidly growing in usage. Additionally, there exist numerous different wireless communication technologies and standards. Some examples of wireless communication standards include GSM, UMTS (associated with, for example, WCDMA or TD-SCDMA air interfaces), LTE, LTE Advanced (LTE-A), HSPA, 3GPP2 CDMA2000 (e.g., 1xRTT, 1xEV-DO, HRPD, eHRPD), IEEE 802.11 (WLAN or Wi-Fi), IEEE 802.16 (WiMAX), Bluetooth, and others.

Many devices which implement such wireless communication technologies are substantially mobile devices, which frequently rely on portable power supplies (e.g., batteries). For such devices in particular, as well as for other devices more generally, the power consumption considerations of implementing wireless communication technologies may be substantial. For example, battery life may influence consumer preference among possible wireless devices.

SUMMARY

This document describes, inter alia, methods for low-energy IEEE 802.11 (Wi-Fi) wireless communication, and describes wireless devices configured to implement the described methods.

Wi-Fi transmissions may generally be structured as having various physical layer (PHY) preamble fields, followed by PHY data, which may include encapsulated header information for higher layers and/or payload data.

Wi-Fi may utilize carrier sensing as a multiple access technology. In this case, a Wi-Fi device may monitor (sense) the Wi-Fi wireless medium for transmissions by other Wi-Fi devices at least some of the time, in order to determine whether the medium is busy or free (e.g., if it has uplink data buffered and wants to use the medium for an uplink transmission) and/or to determine if any transmissions are intended for the device.

In order to conserve power, it may be desirable that the device not spend any more time monitoring the medium than required to determine that the transmission is not intended for the device and to determine the expected length of the transmission. Upon making this determination, the device can enter a low power (sleeping) state for the remainder of the transmission.

According to the techniques described herein, it may be possible to provide destination and length information early in the PHY preamble portion of a Wi-Fi transmission, which may reduce the amount of time required by a device to determine whether it is the intended recipient of a transmission, and to determine the scheduled duration of the transmission, and thus increase the amount of time in which the device may remain in a low power state, potentially reducing the power consumption of the device.

It may be possible to include destination and length information for a Wi-Fi transmission prior to or as part of a portion of the PHY preamble configured for channel estimation.

For example, a low-energy signaling (LE-SIG) field may be introduced prior to the legacy long training (L-LTF) field (which is currently used for channel estimation) and may include destination and length information for the Wi-Fi transmission in which it is included. Such a field may be differentially encoded, if desired, since without channel estimation it may (at least in some instances) be difficult or impossible to utilize coherent encoding.

The techniques described herein may be implemented in and/or used with a number of different types of devices, including but not limited to cellular phones, portable media players, portable gaming devices, tablet computers, wearable computing devices, remote controls, wireless speakers, set top box devices, television systems, and computers.

This summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of the preferred embodiment is considered in conjunction with the following drawings, in which.

Figure 1:
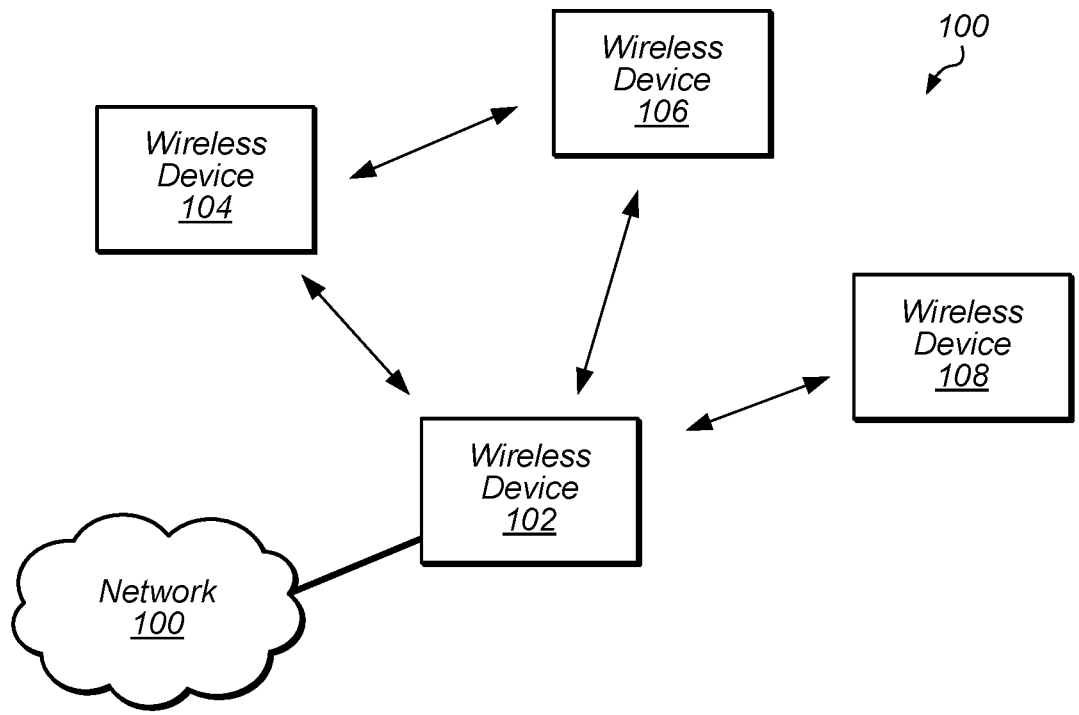
FIGS. 1-2 illustrate exemplary (and simplified) wireless communication systems, according to some embodiments.

While the features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION OF THE EMBODIMENTS

Terms

The following is a glossary of terms used in the present disclosure:

Memory Medium—Any of various types of non-transitory computer accessible memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic."

Computer System—any of various types of computing or processing systems, including a personal computer system (PC), mainframe computer system, workstation, network appliance, Internet appliance, personal digital assistant (PDA), personal communication device, smart phone, television system, grid computing system, or other device or combinations of devices. In general, the term "computer system" can be broadly defined to encompass any device (or combination of devices) having at least one processor that executes instructions from a memory medium.

Station (STA)—any of various types of computer systems devices which are mobile or portable and which performs wireless communications. Examples of STAs include mobile telephones or smart phones (e.g., iPhone™, Android™-based phones), portable gaming devices (e.g., Nintendo DS™, PlayStation Portable™, Gameboy Advance™, iPhone™), laptops, wearable devices (e.g., smart watch, smart glasses), PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Base Station or Access Point (AP)—The term "Base Station" has the full breadth of its ordinary meaning, and at least includes a wireless communication station installed at a fixed location and used to communicate as part of a wireless telephone system or radio system.

Processing Element—refers to various elements or combinations of elements. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

PHY rate or PHY data rate—A rate at which devices communicate with each other over a medium. Many wireless communication technologies (including IEEE 802.11) may provide for the use of different combinations of modulation type, coding rate, numbers of spatial streams, channel widths, and/or other physical layer characteristics. Each such combination may result in (and in some cases be referred to as) a "PHY rate". The combination of physical layer characteristics which result in a given PHY rate may also be referred to as a "modulation and coding scheme", "MCS", or "MCS index". "Lower" or "more robust" PHY rates/MCS indices may provide receivers with greater capability to successfully receive information being communicated under less-than-ideal medium conditions than "higher" or "less robust" PHY rates (e.g., by using a lower density modulation scheme and/or including a greater proportion of error correction coding information), often at a cost of potential throughput. Higher or less robust PHY rates may, in contrast, provide more efficient medium use and provide greater throughput than lower PHY rates (e.g., by using a higher density modulation scheme and/or including a lesser proportion of error correction coding information), but may be more difficult to receive under less-than-ideal medium conditions.

IEEE 802.11—refers to technology based on IEEE 802.11 wireless standards such as 802.11a, 802.11b, 802.11g, 802.11n, 802.11-2012, 802.11ac, and/or other IEEE 802.11 standards. IEEE 802.11 technology may also be referred to as "Wi-Fi" or "wireless local area network (WLAN)" technology.

Figure 2:
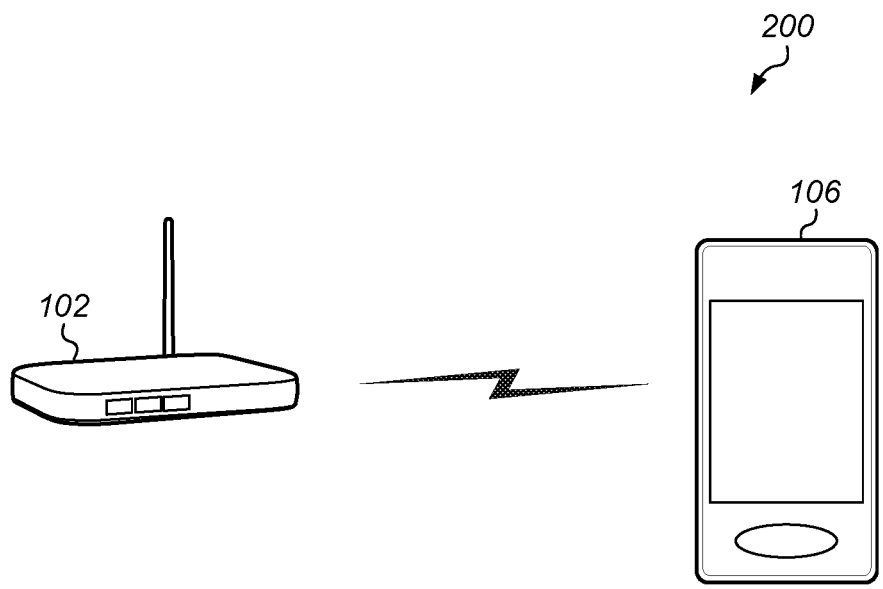

FIGS. 1-2—Communication System

FIG. 1 illustrates an exemplary (and simplified) wireless communication system 100, according to some embodiments. It is noted that the system 100 of FIG. 1 is merely one example of a possible system, and embodiments may be implemented in any of various systems, as desired. For example, note that although the exemplary wireless communication system 100 illustrated in FIG. 1 is shown as including four wireless devices, aspects of the disclosure may be implemented in wireless communication systems having greater or lesser numbers (i.e., any arbitrary number) of wireless devices.

As shown, the exemplary wireless communication system 100 includes multiple wireless devices 102-108 which communicate over a transmission medium. Some or all of the wireless devices may be substantially mobile devices ("stations" or "STAs"). Alternatively, or in addition, some or all of the wireless devices may be substantially stationary.

The wireless devices 102-108 may communicate over the wireless transmission medium in such a manner as to form a wireless network. The wireless network may be an IEEE 802.11 'infrastructure mode' network provided by a dedicated access point (e.g., wireless device 102); alternatively, the wireless network may be an 'ad-hoc' or peer-to-peer based network. Note that it may be possible that the wireless network may include one or more 'hidden nodes'; for example, as shown, wireless device 108 may be within communication range of wireless device 102, but may not be able to detect (and/or be detected by) wireless devices 104 and 106. The wireless devices 102-108 may be configured to perform low energy IEEE 802.11 wireless communication according to aspects of the present disclosure.

One or more of the wireless devices may be equipped to communicate with one or more external networks. For example, as shown, wireless device 102 may be communicatively coupled to network 100. The external network(s) may be any of a variety of types of networks, such as a cellular service provider's core network (e.g., via a cellular base station), the Internet, or an organization's intranet, among various possibilities.

Note that one or more of the wireless devices 102-108 may be capable of communicating using multiple wireless communication standards. For example, one or more of the wireless devices 102-108 may be configured to communicate using at least one wireless networking protocol (e.g., Wi-Fi) and/or peer-to-peer wireless communication protocol (e.g., BT, Wi-Fi peer-to-peer, etc.) and at least one cellular communication protocol (e.g., GSM, UMTS, LTE, LTE-Advanced (LTE-A), 3GPP2 CDMA2000 (e.g., 1×RTT, 1×EV-DO, HRPD, eHRPD), etc.). Any or all of wireless devices 102-108 may also or alternatively be configured to communicate using one or more global navigational satellite systems (GNSS, e.g., GPS or GLONASS), one or more mobile television broadcasting standards (e.g., ATSC-M/H or DVB-H), and/or any other wireless communication protocol, if desired. Other combinations of wireless communication standards (including more than two wireless communication standards) are also possible.

FIG. 2 illustrates an exemplary wireless communication system 200 in which aspects of the system 100 of FIG. 1 according to one possible implementation are represented, according to some embodiments. As shown, in the illustrated system wireless device 106 may be a mobile station (STA) 106 and wireless device 102 may be an access point 102 (also referred to as an "AP", or alternatively as a "base station" or "BS"). The STA 106 may be a user device with Wi-Fi communication capability such as a mobile phone, a hand-held device, a wearable device, a computer or a tablet, or virtually any type of wireless device. The AP 102 may be an access point device with Wi-Fi communication capability such as a wireless router or other wireless access point.

Either or both of the AP 102 and the STA 106 may include a processor that is configured to execute program instructions stored in memory. Either or both of the AP 102 and the STA 106 may perform any of the method embodiments described herein by executing such stored instructions. Alternatively, or in addition, a programmable hardware element such as an FPGA (field-programmable gate array) that is configured to perform any of the method embodiments described herein, or any portion of any of the method embodiments described herein, may be included as part of the AP 102 and/or the STA 106.

Figure 3:
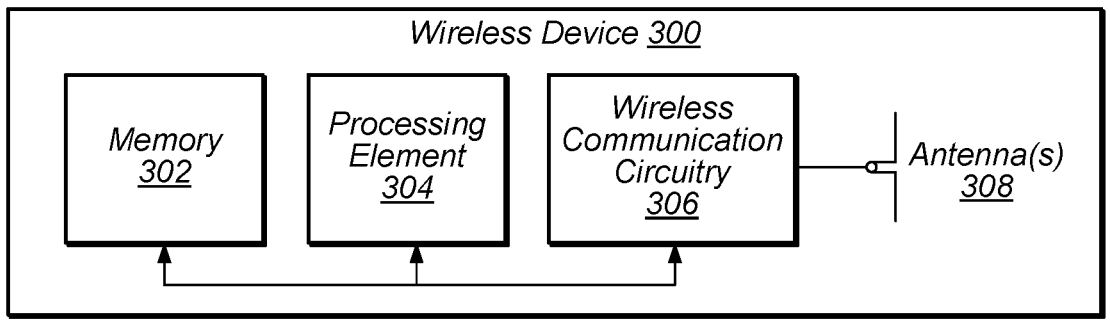
FIG. 3 illustrates a block diagram of an exemplary wireless device, according to some embodiments.

FIG. 3—Exemplary Block Diagram of a Wireless Device

FIG. 3 illustrates an exemplary block diagram of a wireless device 300 which may be configured for use in conjunction with various aspects of the present disclosure, according to some embodiments. The device 300 may be any of a variety of types of device and may be configured to perform any of a variety of types of functionality. For example, the device 300 may be a substantially portable device (a mobile device), such as a mobile phone, a personal productivity device, a computer or a tablet, a handheld gaming console, a portable media player, etc. Alternatively, the device 300 may be a substantially stationary device, such as a television, a subwoofer, speaker, or other audio rendering device, a wireless access point, a set-top box, etc., if desired.

As shown, the device 300 may include a processing element 304. The processing element 304 may include or be coupled to one or more local and/or system memory elements, such as memory 302. Memory 302 may include any of a variety of types of memory and may serve any of a variety of functions. For example, memory 302 could be RAM serving as a system memory for processing element 304. Other types of memory and functions are also possible.

The device 300 may also include wireless communication circuitry 306. The wireless communication circuitry 306 may include analog and/or digital circuitry components, and may alternatively be referred to as a 'radio'. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the wireless device 300 may share one or more parts of a receive and/or transmit chain between multiple wireless communication technologies, such as those discussed above. The wireless communication circuitry may include or be coupled to one or more antennas 308.

Note that if desired, the wireless communication circuitry 306 may include a discrete processing element in addition to processing element 304; for example, processing element 304 may be an 'application processor' while wireless communication circuitry 306 may include its own 'baseband processor'; alternatively (or in addition), processing element 304 may providing processing capability for the wireless communication circuitry 306. The device 300 may be capable of communicating using any of various wireless communication technologies by way of wireless communication circuitry 306 and antenna(s) 308.

The device 300 may additionally include any of a variety of other components (not shown) for implementing device functionality, depending on the intended functionality of the device 300, which may include further processing and/or memory elements, one or more power supply elements (which may rely on battery power and/or an external power source), user interface elements (e.g., display, speaker, microphone, camera, keyboard, mouse, touchscreen, etc.), additional communication elements (e.g., antenna(s) for wireless communication, I/O ports for wired communication, communication circuitry/controllers, etc.) and/or any of various other components.

The components of the device 300, such as processing element 304, memory 302, wireless communication circuitry 306, and antenna(s) 308, may be operatively coupled via one or more intra-chip or inter-chip interconnection interfaces, which may include any of a variety of types of interface, possibly including a combination of multiple types of interface. As one example, a USB high-speed inter-chip (HSIC) interface may be provided for inter-chip communications between processing element 304 and wireless communication circuitry 306. Alternatively (or in addition), a universal asynchronous receiver transmitter (UART) interface, a serial peripheral interface (SPI), inter-integrated circuit (I2C), system management bus (SMBus), and/or any of a variety of other communication interfaces may be used for communications between processing element 304, memory 302, wireless communication circuitry 306, and/or any of various other device components. Other types of interfaces (e.g., peripheral interfaces for communication with peripheral components within or external to device 300, etc.) may also be provided as part of device 300.

Figure 4:
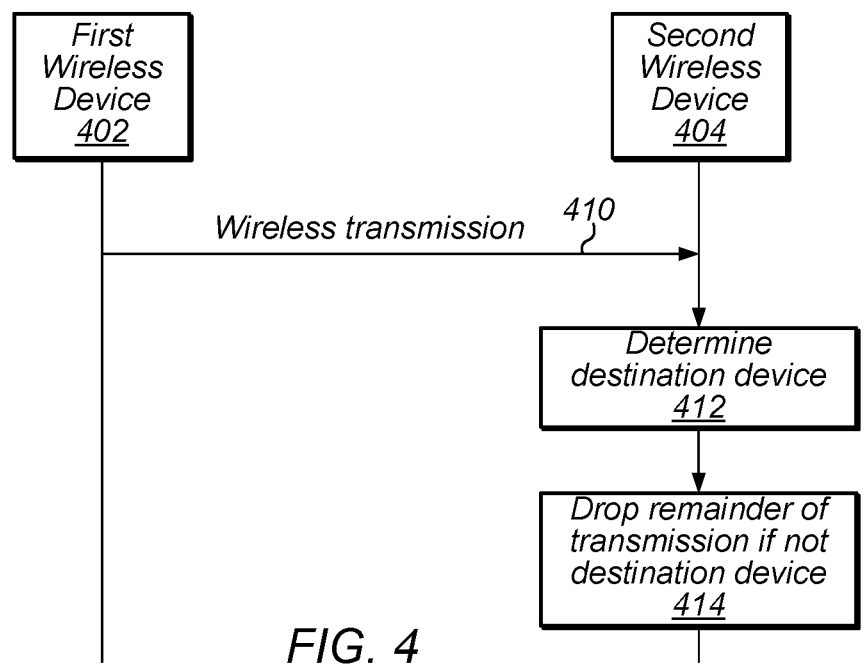
FIG. 4 is a signal flow diagram illustrating aspects of an exemplary method for wireless communication, including an early indication of destination and length information, according to some embodiments.

As described herein, the device 300 may include hardware and software components for implementing features for performing low energy IEEE 802.11 wireless communication, such as those described herein with reference to, inter alia, FIG. 4.

FIG. 4—Communication Flow Diagram

FIG. 4 is a communication/signal flow diagram illustrating a scheme that may be used for performing wireless communication in a wireless communication system, such as an IEEE 802.11 wireless communication system, according to some embodiments. The scheme may be used to reduce power consumption of devices in the wireless communication system, in particular by enabling devices in the system to rapidly determine whether a given transmission (e.g., physical layer packet) is intended for that device and the length of the transmission. For example, in the case in which a device determines that it is not the intended destination for a transmission, the device may be able to drop the remainder of the transmission and enter a lower power state (e.g., sleep) for the remaining length of the transmission, thereby avoiding as much unneeded power consumption as possible.

The method shown in FIG. 4 may be used in conjunction with any of the computer systems or devices shown in the above Figures, among other devices. Some of the method elements shown may be performed concurrently, in a different order than shown, or may be omitted. Additional and/or alternative method elements may also be performed as desired. As shown, the methods may operate as follows.

A first wireless device 402 may perform a wireless transmission 410 (a "first wireless transmission"). The first wireless transmission may be performed according to any of a variety of wireless communication technologies and/or standards, as desired. As one specific possibility, the first wireless transmission may be an IEEE 802.11 (Wi-Fi) transmission.

The first wireless transmission may include a physical layer (PHY) preamble and signaling information, as well as PHY data. The PHY data may include encapsulated higher layer data for any of various possible networking, application, and/or other protocol stack layers, for example depending on the communication standard(s) and/or technologies in conjunction with which the first wireless transmission is being performed.

The PHY preamble and signaling information may facilitate carrier sensing and physical layer reception and decoding of the first wireless transmission by devices capable of receiving the first wireless transmission, and may include portions for any of various desired functions. For example, the PHY preamble and signaling information may include portions configured for any or all of signal/packet detection, gain control (e.g., automatic gain control (AGC)), coarse and/or fine frequency offset estimation and correction, coarse and/or fine timing estimation, channel estimation, modulation scheme and/or coding rate information, transmission length, transmission destination(s), and/or any of various other information.

For example, in the exemplary case in which the first wireless transmission is a Wi-Fi transmission, the PHY preamble may include any or all of a legacy short training field (L-STF), a legacy long training field (L-LTF), a legacy signal field (L-SIG), as well as one or more 'high throughput' (HT) and/or 'very high throughput' (VHT) short training fields, long training fields, and/or signal fields, depending on the version (e.g., 802.11n, 802.11ac, etc.) of the Wi-Fi transmission.

As shown, at least a portion of the first wireless transmission 410 may be received by a second wireless device 404. In 412, the second wireless device 404 may determine the intended destination of the first wireless transmission 410, for example based on destination information included in the PHY preamble.

In 414, if the second wireless device 404 is not the intended destination of the first wireless transmission (e.g., as indicated by the destination information), the second wireless device 404 may drop the remainder of the first wireless transmission. For example, the second wireless device 404 may cease receiving and decoding using its receive chain upon determining that the first wireless transmission 410 is not destined to the second wireless device 404, and may 'sleep' or enter a low power state (e.g., power down some or all radio components) for the remainder of the transmission. The length of time for which the second wireless device 404 sleeps may be determined based on the length information provided in the PHY preamble.

At least in some instances, destination and length information for the first wireless transmission 410 may be included early in the first wireless transmission 410. For example, as one possibility, referring again to the exemplary case in which the first wireless transmission 410 is a Wi-Fi transmission, the destination and length information may be provided in a 'low energy signal' or 'LE-SIG' field (e.g., a new field), which may be included in the first wireless transmission 410 subsequent to the L-STF and prior to the L-LTF.

In this exemplary case, receiving devices may not yet have performed channel estimation (e.g., which may be based on the L-LTF) upon receiving the destination and length information. Accordingly, in order to enable receiving devices to successfully decode the destination and length information, at least in some instances the LE-SIG field may be differentially encoded. This may be in contrast to subsequent portions of the first wireless transmission 410 (e.g., portions subsequent to channel estimation, such as subsequent to the L-LTF), which may be coherently encoded.

As noted hereinabove, a device which is not the intended destination of the first wireless transmission 410 may be able to drop the remainder of the transmission and sleep as soon as it is able to determine that the transmission is not for that device. Thus, the earlier destination and length information are provided for a given transmission, the earlier each respective device to which the transmission is not destined may return to a low power state and avoid any further unneeded power consumption, while still remaining in synchronization with the transmission schedule of the wireless communication system (and thus remaining able to wake up in a timely manner for a next transmission, which may be intended for the respective device).

Thus, including the destination and length information as early as reasonably possible in the first wireless transmission 410 may result in relatively power-efficient operation for devices in the wireless communication system. This may particularly be the case as the number of devices in the wireless communication system increases, since as the number of devices in the system increases, it may be the case that the proportion of transmissions which are not intended for each respective device may increase. In other words, the power consumption reducing effect of a technique (such as described herein) which reduces power consumption in the case in which a device is not the intended recipient of a given transmission may be proportionally more significant as the number of devices in a wireless communication system grows.

FIGS. 5-10—Exemplary 802.11 Implementation Details

FIGS. 5-10 and the information provided herein below in conjunction therewith are provided by way of example of various considerations and details relating to possible IEEE 802.11 wireless communication systems in which the method of FIG. 4 may be implemented, according to some embodiments, and are not intended to be limiting to the disclosure as a whole. Numerous variations and alternatives to the details provided herein below are possible and should be considered within the scope of the disclosure.

In Wi-Fi communication systems, significant power savings are achieved by allowing Wi-Fi devices (e.g., STAs) to sleep as much as possible. For example, one possible power save (PS) mode of operation may include a STA waking up at specific intervals (e.g., delivery traffic indication message (DTIM) intervals) to 'listen' to transmissions from the access point. If there is traffic buffered at the AP for the STA, the STA can then remain awake until the AP has sent all of the buffered data to the STA; otherwise, the STA may sleep until the next specified interval and check again for buffered traffic.

However, depending on the loading of the cell, the STA may be forced to wait a greater or lesser amount of time before the AP transmits its data (e.g., due to the carrier sense multiple access/collision avoidance (CSMA/CA) nature of the protocol and time-sharing of the medium). In the meantime, the STA may listen to (at least a portion of) every transmission on the medium, since it may not know when it's packet will arrive.

As described with respect to FIG. 4, it may be possible for a STA to listen to only a portion of a packet, determine that the packet is not intended for the STA, and drop the remainder of the packet and sleep until the next transmission, which may reduce the power consumption of the STA during such periods of waiting for a transmission. This may include setting a network allocation vector (NAV) to enable "virtual carrier sensing". As also previously noted with respect to FIG. 4, greater power consumption reduction may be achieved with earlier inclusion of the information needed for such a capability.

Figure 5:
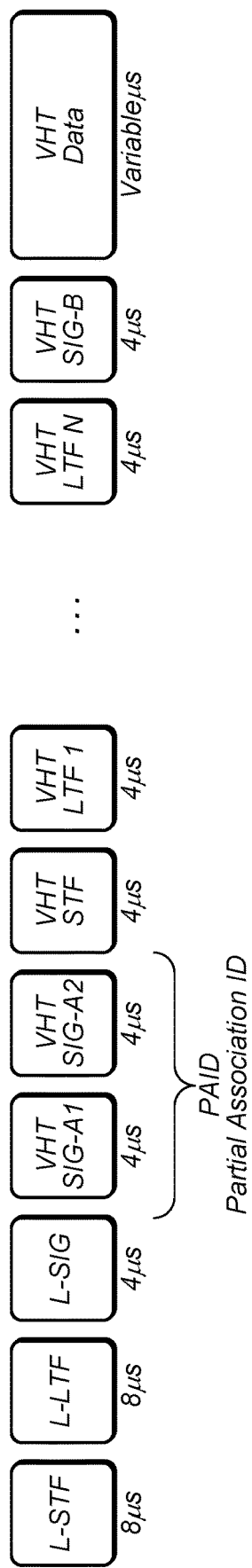
FIGS. 5-10 illustrate exemplary implementation details of possible systems implementing aspects of the method of FIG. 4 in which destination and length information is included in a LE-SIG field of a Wi-Fi transmission, according to some embodiments.
Figure 6:
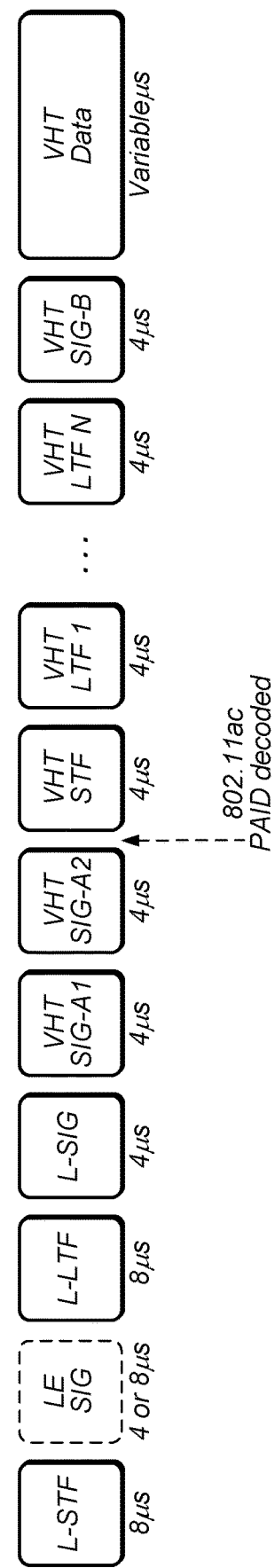

According to some embodiments, it may be possible to define a new field, for example for inclusion between the L-STF and the L-LTF, in which destination and length information is provided. FIGS. 5-6 illustrate how a packet structure including such a field may differ from an 802.11ac packet structure, according to some embodiments. As shown, FIG. 5 illustrates an exemplary IEEE 802.11ac physical layer packet structure, including PHY preamble and PHY data. As shown, the preamble may include various legacy and very high throughput short training fields, long training fields, and signal fields, each of a fixed length, and may be followed by a very high throughput data field (i.e., the PHY data) which maybe of a variable length.

In the exemplary IEEE 802.11ac physical layer packet structure illustrated in FIG. 5, destination information (in particular, a partial association ID or PAID) for the packet may be provided in the VHT SIG-A1 field, and may be decoded and used to determine the destination of the packet after receipt of the VHT SIG-A2 field. Thus, (e.g., in combination with length information provided in the L-SIG field), a device decoding a packet which determines that it is not the intended receiver of the packet may be able to drop the remainder of the packet and sleep, after an initial time, e.g., 28 μs, for the length of time during which the remainder of the packet is being transmitted.

FIG. 6 illustrates an exemplary new IEEE 802.11 physical layer packet structure including a new 'low energy signal' or 'LE-SIG' field between the L-STF and the L-LTF. The LE-SIG field may include destination and length information for the packet, and thus may enable a receiving device which is not the intended receiver of the packet to drop the remainder of the packet and sleep for the length of time during which the packet is being transmitted after the LE-SIG field. If the LE-SIG field is 4 μs, this would mean a receiving device could sleep after just 12 μs, while if the LE-SIG field is 8 μs, this would mean a receiving device could sleep after just 16 μs. These would represent approximately 57% (12/28) or 43% (16/28) power savings compared to if the packet structure illustrated in FIG. 5 were used.

The L-STF may serve several functions, including any or all of the start of packet detection, AGC, coarse frequency offset estimation and correction, and coarse timing estimation. At least in some instances, the L-STF may not be sufficient for a receiving device to perform channel estimation (which may be performed using/based on the L-LTF); accordingly, in order to include destination and length information in the LE-SIG and provide the LE-SIG between the L-STF and the L-LTF as shown in FIG. 6 with reasonable expectation of usability by receiving devices, the LE-SIG may be differentially encoded. For example, the information may be encoded in the transitions from one sample to the next, rather than in the sample itself (i.e., coherent encoding).

As previously noted, the LE-SIG may include destination information and length information for the packet. The format of the LE-SIG may be designed as desired; for example, any format and field length for the destination information and the length information may be used. As one possibility, the LE-SIG may include 23 information bits (and 24 bits in total, as the first bit may be a reference bit for the differential encoding), of which 9 bits may indicate the PAID (or any other compressed format, such as partial MAC address or groupID) of the destination address, 11 bits may indicate the length of the packet in OFDM symbols, and 3 bits may be cyclic redundancy check information. Such a format may support approximately 1000 STAs per basic service set (BSS) and a maximum packet length of 5.46 ms. Different numbers of information bits (in total and/or per field), different field formats (e.g., different destination address format, length measurement in bytes, µs, or any other metric, including or not including acknowledgement, etc., as desired), inclusion of additional information, and/or other variations in the LE-SIG field may be used, as desired.

The LE-SIG may be designed to use or not use coding as desired, and to be repeated (e.g., for time diversity, noise reduction, etc.) any desired number of times. For example, the modulated symbols may be repeated four times without coding over an 8 µs interval, or may be repeated two times with r=1/2 coding over an 8 µs interval. Furthermore, the LE-SIG may be transmitted at any of various possible PHY data rates, as desired. For example, a 6 Mbps data rate may be used for one OFDM symbol period (4 µs), or a 3 Mbps data rate may be used for two OFDM symbol periods (8 µs).

Figure 7:
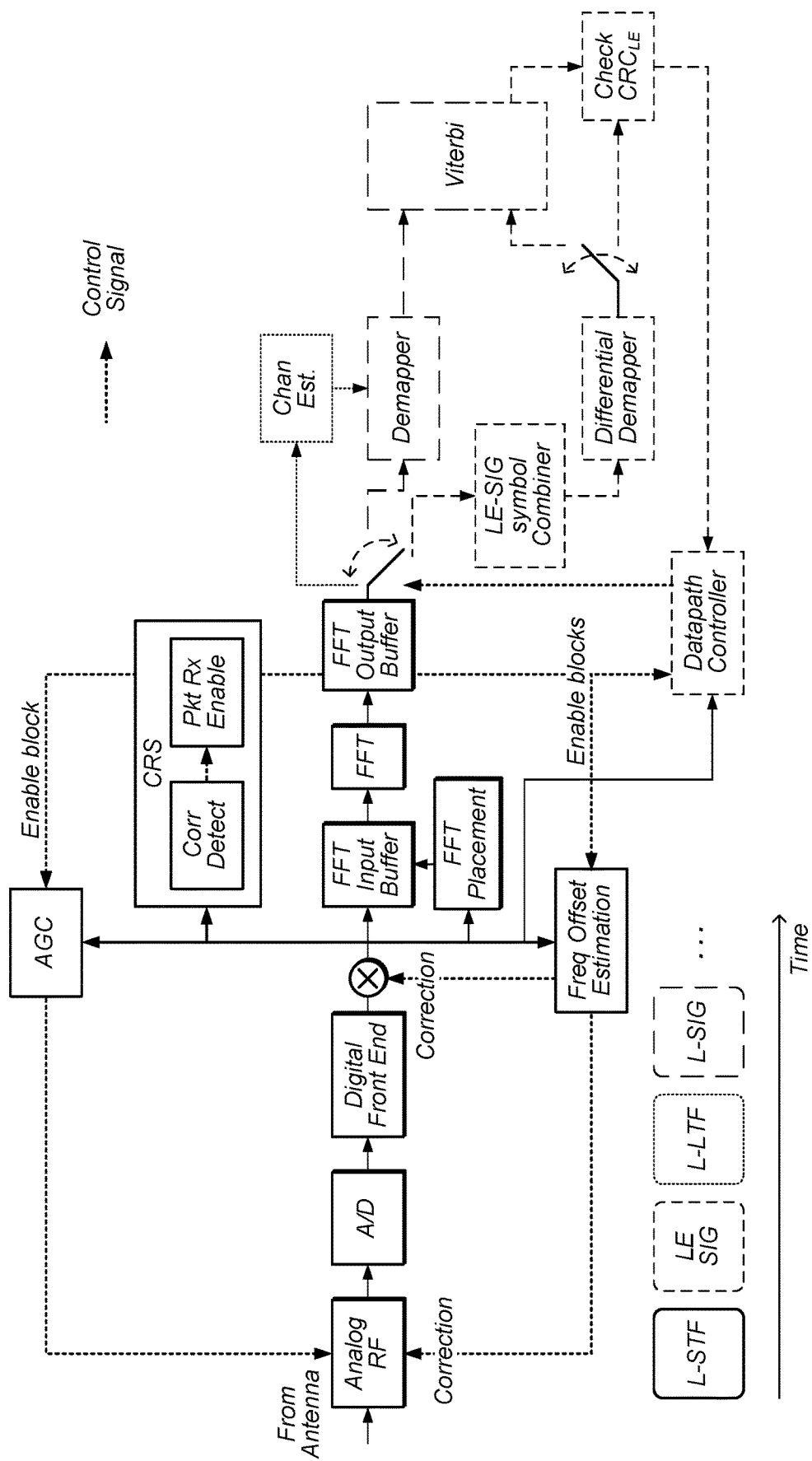

Since the LE-SIG may encode information differentially, a device configured to utilize the LE-SIG may include a differential demapper functional block (e.g., as part of its radio). FIG. 7 illustrates an example receiver block diagram which includes a differential demapper block, and which may be used to decode a differentially encoded LE-SIG field according to different possible implementations.

As shown, the receiver may include analog radio frequency (RF) circuitry, which may receive signals from an antenna and provide those (e.g., filtered, amplified, and/or otherwise modified) signals to an analog to digital converter (A/D), which may in turn convert the analog signals to digital signals and provide them to digital front end circuitry. Based on the L-STF field of an incoming signal, the receiver may be able to perform carrier sensing (CRS) to detect incoming packets, and may also configure automatic gain control (AGC) and perform frequency offset estimation and correction for each detected incoming packet (e.g., based on a control signal from the carrier sensing block, which may be provided based on incoming packet detection).

After Fast Fourier Transform (FFT) placement and FFT (which may utilize FFT input and output buffers), incoming signals may be provided to a channel estimation block, a demapper block, or a LE-SIG symbol combiner block, e.g., depending on which portion of a transmission is incoming at a particular time. As shown, incoming signals may also be provided to a datapath controller block, which may analyze the signals to determine which datapath to enable. For example, the datapath controller may be able to detect whether the second field of an incoming packet is an LE-SIG field or an L-LTF field, and enable the datapath to the LE-SIG symbol combiner and differential demapper or the channel estimation block respectively.

Thus, if the second field is an LE-SIG field, the signals of the LE-SIG field may be provided to the LE-SIG symbol combiner (e.g., since they may be repeated, in order to obtain noise reduction benefits), and thence to a differential demapper. Alternatively (e.g., if the LE-SIG signals are not repeated), no LE-SIG symbol combiner block may be used and the LE-SIG datapath may provide signals from the FFT block directly to the differential demapper. The differential demapper block may determine the value of each bit (tone) based on the difference relative to the previous tone; for example, if a tone is rotated from the previous tone, this may indicate a '1', while if a tone is the same as the previous tone, this may indicate a '0'. If the LE-SIG uses coding (e.g., r=1/2 coding), the viterbi block may also be used as part of decoding the LE-SIG, after which the $CRC_{LE}$ may be checked to verify that the LE-SIG has been correctly decoded. Alternatively, if the LE-SIG is uncoded, the datapath may flow from the differential demapper directly to the $CRC_{LE}$ check.

If the receiver is the intended receiver of the packet, channel estimation may then be performed based on the L-LTF field using the channel estimation block, subsequent to which the L-SIG field and subsequent fields (which may be coherently encoded) may be decoded using coherent detection at the demapper and viterbi blocks.

As noted above, the datapath controller may identify which type of preamble is being received (e.g., legacy or LE), and switch the datapath accordingly. For LE preambles, the datapath controller may also check the destination and length information in the LE-SIG to determine whether to proceed further or drop the packet. Identifying the preamble type may be performed in any of various ways as desired; as one possibility, the L-LTF frame structure may be exploited to quickly recognize whether or not a field (e.g., the second field of the PHY preamble) is the L-LTF.

Figure 8:
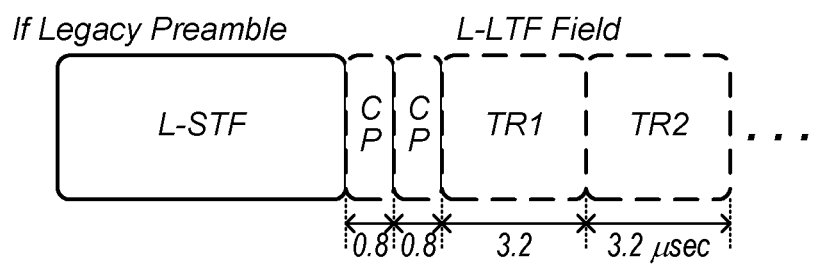
Figure 8:
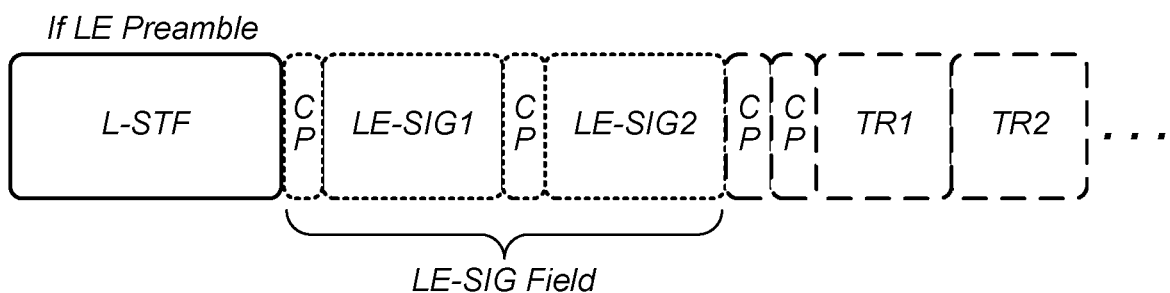

For example, as shown in FIG. 8, an L-LTF may include a cyclic prefix during the first 0.8 µs of the field, and may repeat the cyclic prefix during the second 0.8 µs of the field. In contrast, an LE-SIG field may include a single cyclic prefix prior to each of the LE-SIG1 and LE-SIG2 portions of the field. Thus, following the L-STF, the datapath controller may collect a 0.8 µs sample and perform auto-correlation. If there is a peak in the next 0.8 µs, this may indicate that the field is an L-LTF field (and that the preamble of the incoming packet is a legacy preamble), while if not, this may indicate that the field is an LE-SIG field (and that the preamble of the incoming packet is a LE preamble). Thus, such classification may be performed within 1.6 µs after the L-STF field.

Figure 9:
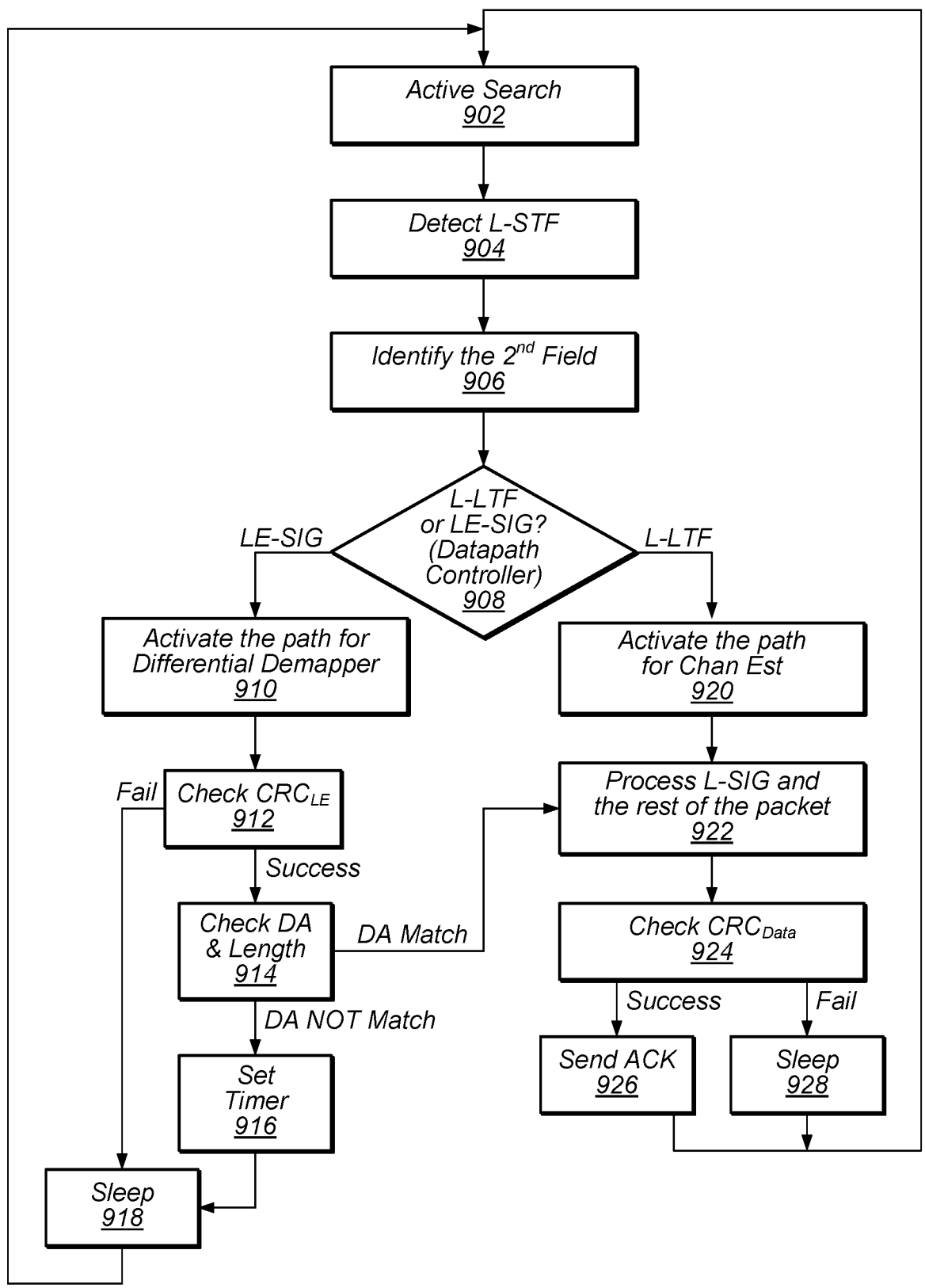

FIG. 9 is a flowchart diagram illustrating an example process flow for PS operation of a device configured to utilize a packet structure which includes an LE-SIG field such as described herein.

As shown, in 902 the device may actively search for incoming transmissions. After detecting an incoming packet (detecting an L-STF) in 904, the device may identify the second field in 906. In particular, it may be determined in 908 whether the second field is an L-LTF field (e.g., if the incoming packet is a legacy packet) or an LE-SIG field (e.g., if the incoming packet has the packet structure illustrated in and described with respect to FIG. 6).

One mechanism for identifying the second field may be to simply attempt to decode the second field as both an L-LTF (e.g., determining whether the incoming signal matches the expected training sequence) and as an LE-SIG (e.g., determining whether the CRC value for what would be the LE-SIG is correct), for example using multiple blocks of the receive chain simultaneously, e.g., in parallel.

Alternatively, as shown, a data path controller (such as previously described herein, including with respect to FIGS. 7-8) may be used for early identification of the second field. The data path controller may run a time-domain correlator (e.g., in dedicated hardware) following the L-STF on the repeated cyclic prefix which may be present in a legacy preamble to determine the identity of the second field prior to or at the beginning of the second field.

If the second field is an LE-SIG field, in 910 the receive path for the differential demapper may be activated. In 912 the CRC for the LE-SIG ($CRC_{LE}$) may be checked. If the $CRC_{LE}$ succeeds, in 914 the destination address (DA) and length of the packet may be checked. Assuming the DA is not that of the device implementing the process flow of FIG. 9, in 916 and 918 respectively the device may set a timer and sleep for the length of the packet. If the DA is that of the device implementing the process flow of FIG. 9, the device may proceed from step 914 to step 922 to continue decoding the remainder of the packet.

If in step 912 the $CRC_{LE}$ fails, this may be a result of poor reception conditions (or possibly may result if the packet is a legacy packet and the second field is actually an L-LTF field). As one possibility (and as shown), the device may proceed to step 918, and simply drop the remainder of the packet and sleep for a period of time (e.g., for a random or pseudorandom period of time, until the next beacon, or for any other desired interval), after which the device may wake up and return to step 902 to again actively search for incoming packets. As another possibility (not shown), the device may attempt to continue to receive the packet (e.g., performing channel estimation on the L-LTF field and decoding subsequent fields), at least until the next indication of the destination address and packet length are received.

If it is determined in step 908 that the packet includes a legacy preamble and the second field is an L-LTF field, the device may follow the right-hand side of the illustrated process flow. Proceeding to step 920 in this case, the device may activate the path for channel estimation, then in 922 the device may process the L-SIG and the rest of the packet (at least until an indication of the destination address and packet length are received). If the packet is not intended for the device (once this is determined), the device may drop the packet and sleep for the remainder of the packet duration; if the packet is intended for the device, in 924 the device may check the $CRC_{Data}$ at the end of the packet, and if successful, in 926 may send an acknowledgement. If the $CRC_{Data}$ fails, the device may instead proceed to step 928 and sleep for a period of time (e.g., for a random or pseudorandom period of time, until the next beacon, or for any other desired interval), after which the device may wake up and return to step 902 to again actively search for incoming packets.

Figure 10:
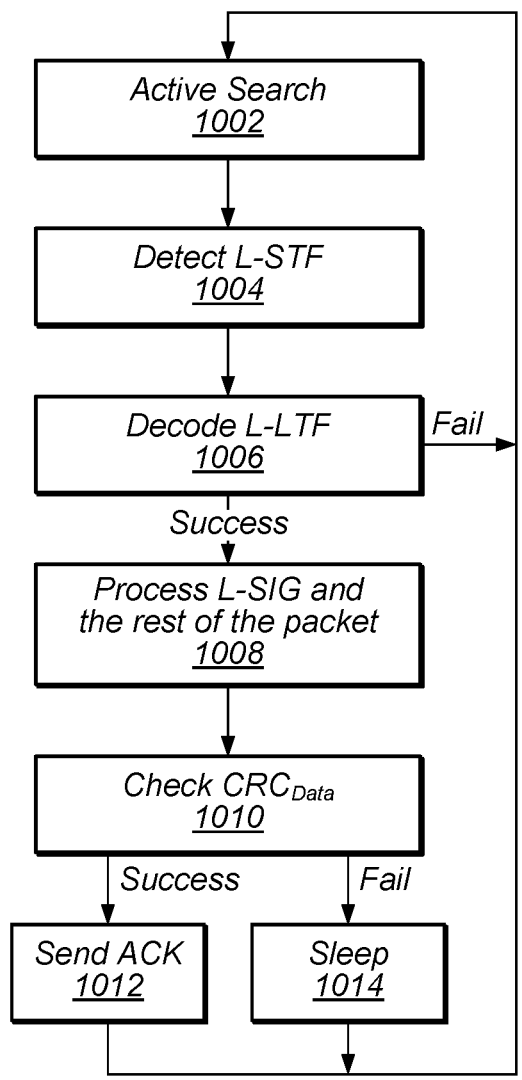

FIG. 10 is a flowchart diagram illustrating an example process flow for operation of a legacy device which is not configured to utilize a packet structure which includes an LE-SIG field such as described herein.

As shown, in 1002 the device may actively search for incoming transmissions. After detecting an incoming packet (detecting an L-STF) in 1004, in 1006 the device may attempt to decode the second field as a L-LTF. If the incoming packet is a legacy packet (in which case the second field may indeed be a L-LTF), the device may succeed in decoding the L-LTF, and may subsequently be able to process the L-SIG and the remainder of the packet in 1008. The device may thus continue to process the packet, at least until an indication of the destination address and packet length are received. If the packet is not intended for the device, the device may drop and sleep for the remainder of the packet once this is determined; if the packet is intended for the device, in 1010 the device may check the $CRC_{Data}$ at the end of the packet, and if successful, in 1012 may send an acknowledgement. If the $CRC_{Data}$ fails, the device may instead proceed to step 1014 and sleep for a period of time (e.g., for a random or pseudorandom period of time, until the next beacon, or for any other desired interval), after which the device may wake up and proceed to step 1002 to again actively search for incoming packets.

If the incoming packet is not a legacy packet (in which case the second field may be a LE-SIG field), in 1006 the device may fail to decode the L-LTF. In this case, the device may sleep (e.g., for a random or pseudorandom period of time, until the next beacon, or for any other desired interval) and eventually wake up to again actively search for incoming packets, or may immediately transition back to step 1002 for an active search for incoming packets. Thus, use of a packet structure including an LE-SIG field such as described herein may not provide backwards compatibility with legacy devices, at least in some instances.

In the following further exemplary embodiments of the disclosure are presented.

1. A method, comprising: receiving, by a wireless device, a wireless transmission, wherein the wireless transmission comprises a physical layer (PHY) preamble and PHY data; wherein the PHY preamble comprises destination information indicating a destination and length information indicating a length of the wireless transmission; wherein the PHY preamble comprises a portion configured for channel estimation; wherein the destination information and the length information are located prior to the portion of the PHY preamble configured for channel estimation; determining, by the wireless device, whether the destination information indicates that the wireless transmission is destined to the wireless device; dropping, by the wireless device, the remainder of the wireless transmission if the destination information indicates that the wireless transmission is not destined to the wireless device.

2. The method of example 1, wherein the destination information and the length information are differentially encoded; wherein portions of the wireless transmission subsequent to the portion configured for channel estimation are coherently encoded.

3. The method of any of examples 1-2, wherein the wireless transmission is an IEEE 802.11 wireless communication; wherein the PHY preamble comprises at least a legacy short training field and a legacy long training field; wherein the destination information and the length information are provided subsequent to the legacy short training field and prior to the legacy long training field.

4. The method of any of examples 1-3, wherein dropping, by the second wireless device, the remainder of the first wireless transmission comprises sleeping or entering a low power state for the length of the first wireless transmission based on the length information.

5. A method, comprising: performing, by a first wireless device, a first wireless transmission, wherein the first wireless transmission comprises a physical layer (PHY) preamble and PHY data, wherein the PHY preamble comprises destination information indicating a device to which the first wireless transmission is destined and length information indicating a length of the first wireless transmission, wherein the PHY preamble comprises a portion configured for channel estimation, wherein the destination information and the length information are located prior to the portion of the PHY preamble configured for channel estimation; receiving, by a second wireless device, at least a portion of the first wireless transmission; if the destination information indicates that the first wireless transmission is not destined to the second wireless device: determining by the second wireless device, that the first wireless transmission is not intended for the second wireless device based on the destination information; and dropping, by the second wireless device, the remainder of the first wireless transmission.

6. A method, comprising: by a wireless device: receiving a wireless transmission, wherein the wireless transmission comprises a physical layer (PHY) preamble and PHY data, wherein the PHY preamble comprises destination information indicating a destination and length information indicating a length of the wireless transmission; determining whether the wireless transmission is or is not destined to the wireless device based on the destination information; and dropping a remainder of the wireless transmission if the wireless transmission is not destined to the wireless device.

7. The method of example 6, wherein the PHY preamble comprises a portion configured for channel estimation, wherein the destination information and the length information are located prior to the portion of the PHY preamble configured for channel estimation.

8. The method of example 6, wherein the destination information and the length information are differentially encoded; wherein portions of the wireless transmission subsequent to the portion configured for channel estimation are coherently encoded.

9. The method of any of examples 6-8, wherein the wireless transmission is an IEEE 802.11 wireless communication, wherein the PHY preamble comprises at least a legacy short training field and a legacy long training field, wherein the destination information and the length information are provided subsequent to the legacy short training field and prior to the legacy long training field.

10. The method of any of examples 6-9, wherein dropping the remainder of the first wireless transmission comprises sleeping or entering a low power state for the length of the first wireless transmission based on the length information.

11. The method of any of examples 6-10, wherein the destination information comprises one of a partial media access control (MAC) address of the destination device or a partial association ID (PAID) of the destination device.

12. The method of any of examples 6-11, wherein the length information indicates a length of the wireless transmission in one or bytes or OFDM symbols.

13. The method of any of examples 6-12, wherein the destination information and the length information are comprised in a differentially encoded field of the PHY preamble, wherein OFDM symbols the destination information and the length information are repeated at least twice during the differentially encoded field.

14. The method of any of examples 6-13, further comprising: determining whether a field of the PHY preamble subsequent to the legacy short training field is a legacy long training field or a low energy signaling field comprising the destination information and the length information.

15. The method of example 14, wherein determining whether the field of the PHY preamble subsequent to the legacy short training field is a legacy long training field or a low energy signaling field further comprises: collecting samples for a first 0.8 µs of the field subsequent to the legacy short training field; performing auto-correlation of the first 0.8 µs with a next 0.8 µs of the field subsequent to the legacy short training field; determining that the field subsequent to the legacy short training field is a legacy long training field if the auto-correlation results in a peak; and determining that the field subsequent to the legacy short training field is a low energy signaling field if the auto-correlation does not result in a peak.

16. A method, comprising: by a first wireless device: generating a signal for wireless transmission, wherein the signal comprises a physical layer (PHY) preamble and PHY data, wherein the PHY preamble comprises destination information indicating a device to which the wireless transmission is intended and length information indicating a length of the wireless transmission, wherein the PHY preamble comprises a portion configured for channel estimation, wherein the destination information and the length information are located prior to the portion of the PHY preamble configured for channel estimation; and wirelessly transmitting the signal.

17. The method of example 16, wherein the destination information and the length information are differentially encoded, wherein portions of the signal subsequent to the portion configured for channel estimation are coherently encoded.

18. The method of any of examples 16-17, wherein the destination information comprises a partial association ID (PAID) of the destination device.

19. The method of any of examples 16-18, wherein the signal is an IEEE 802.11 wireless communication signal, wherein the PHY preamble comprises at least a legacy short training field and a legacy long training field, wherein the destination information and the length information are provided subsequent to the legacy short training field and prior to the legacy long training field.

20. A wireless device, comprising: an antenna; a processing element operably coupled to the antenna; wherein the processing element and the antenna are configured to implement any or all parts of any of the methods of examples 1-19 above.

21. A wireless user equipment (UE) device, comprising: one or more radios, coupled to one or more antennas configured for wireless communication; and an processing element operably coupled to the one or more radios; wherein the UE is configured to implement any or all parts of any of the methods of examples 1-19 above.

22. A non-transitory computer accessible memory medium comprising program instructions which, when executed at a device, cause the device to implement any or all parts of any of the methods of examples 1-19 above.

23. A computer program comprising instructions for performing any or all parts of any of the methods of examples 1-19 above.

24. An apparatus comprising means for performing any or all of the method elements of any of examples 1-19 above.

Embodiments of the present disclosure may be realized in any of various forms. For example some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a STA) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

We claim:

1. An apparatus comprising:
a processor configured to cause a first wireless device to:
generate a signal for wireless transmission, the signal comprising:
physical layer (PHY) data; and
a PHY preamble comprising, within a first signaling field, destination information indicating a destination device to which the wireless transmission is intended, wherein the first signaling field comprises two portions and each respective portion of the two portions is preceded by a respective cyclic prefix, wherein each of the two portions comprises the destination information; and
wirelessly transmit the signal.

2. The apparatus of claim 1,
wherein the destination information is useable by a second wireless device to determine whether the signal is or is not destined to the second wireless device and to drop a remainder of the signal upon a determination that the signal is not destined to the second wireless device.

3. The apparatus of claim 1,
wherein the signal comprises an IEEE 802.11 wireless communication signal, wherein the PHY preamble comprises at least a legacy short training field and a second short training field that is distinct from the legacy short training field, wherein the destination information is provided subsequent to the legacy short training field and prior to the second short training field.

4. The apparatus of claim 3,
wherein the second short training field comprises one of: a high throughput short training field or a very high throughput short training field.

5. The apparatus of claim 1,
wherein the PHY preamble further comprises length information, wherein each of the two portions comprises the length information.

6. The apparatus of claim 1,
wherein the destination information comprises at least one of a partial media access control (MAC) address of the destination or a partial association ID (PAID) of the destination.

7. The apparatus of claim 1,
wherein a cyclic prefix structure of the first signaling field is useable to identify a field of the PHY preamble that comprises the destination information.

8. A first wireless device, comprising:
a radio; and
a processor operably connected to the radio and configured to cause the first wireless device to:
generate a signal for wireless transmission, the signal comprising:
physical layer (PHY) data; and
a PHY preamble comprising, within a first signaling field, destination information indicating a destination device to which the wireless transmission is intended,
wherein the first signaling field comprises two portions and each respective portion of the two portions is preceded by a respective cyclic prefix, wherein each of the two portions comprises the destination information; and
wirelessly transmit the signal.

9. The first wireless device of claim 8,
wherein the destination information is useable by a second wireless device to determine whether the signal is or is not destined to the second wireless device and to drop a remainder of the signal upon a determination that the signal is not destined to the second wireless device.

10. The first wireless device of claim 8,
wherein the signal comprises an IEEE 802.11 wireless communication signal, wherein the PHY preamble comprises at least a legacy short training field and a second short training field that is distinct from the legacy short training field, wherein the destination information is provided subsequent to the legacy short training field and prior to the second short training field.

11. The first wireless device of claim 10,
wherein the second short training field comprises one of: a high throughput short training field or a very high throughput short training field.

12. The first wireless device of claim 8,
wherein the PHY preamble further comprises length information, wherein a first portion of the first signaling field and a second portion of the first signaling field each of the two portions comprises the length information.

13. The first wireless device of claim 8,
wherein the destination information comprises at least one of a partial media access control (MAC) address of the destination or a partial association ID (PAID) of the destination.

14. The first wireless device of claim 8,
wherein a cyclic prefix structure of the first signaling field is useable to identify a field of the PHY preamble that comprises the destination information.

15. An apparatus comprising:
a processor configured to cause a first wireless device to:
receive a signal for wireless transmission, the signal comprising:
physical layer (PHY) data; and
a PHY preamble comprising, within a first signaling field, destination information indicating a destination device to which the wireless transmission is intended, wherein the first signaling field comprises two portions and each respective portion of the two portions is preceded by a respective cyclic prefix, wherein each of the two portions comprises the destination information;

determine whether or not the signal is intended for the first wireless device based on the destination information; and drop a remainder of the signal responsive to determining that the signal is not intended for the first wireless device.

16. The apparatus of claim 15,
wherein a cyclic prefix structure of the first signaling field is useable to identify a field of the PHY preamble that comprises the destination information.

17. The apparatus of claim 15,
wherein the signal comprises an IEEE 802.11 wireless communication signal, wherein the PHY preamble comprises at least a legacy short training field and a second short training field that is distinct from the legacy short training field, wherein the destination information is provided subsequent to the legacy short training field and prior to the second short training field.

18. The apparatus of claim 17,
wherein the second short training field comprises one of: a high throughput short training field or a very high throughput short training field.

19. The apparatus of claim 15,
wherein the PHY preamble further comprises length information, wherein a first portion of the first signaling field and a second portion of the first signaling field each of the two portions comprises the length information.

20. The apparatus of claim 15,
wherein the destination information comprises at least one of a partial media access control (MAC) address of the destination or a partial association ID (PAID) of the destination.

* * * * *